(12) United States Patent
Yamazaki

(10) Patent No.: US 7,366,710 B2
(45) Date of Patent: Apr. 29, 2008

(54) APPARATUS FOR RETRIEVING AND PRESENTING DIGITAL DATA

(75) Inventor: Tatsuya Yamazaki, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 26 days.

(21) Appl. No.: 11/290,454

(22) Filed: Dec. 1, 2005

(65) Prior Publication Data

US 2006/0143145 A1    Jun. 29, 2006

Related U.S. Application Data

(63) Continuation of application No. 10/224,471, filed on Aug. 21, 2002, now abandoned.

(30) Foreign Application Priority Data

Aug. 28, 2001    (JP)    ............... 2001-257674

(51) Int. Cl.
*G06F 17/30*    (2006.01)
*G06F 15/16*    (2006.01)

(52) U.S. Cl. ............... 707/1; 707/3; 707/4; 709/224

(58) Field of Classification Search ............ None
See application file for complete search history.

(56) References Cited

U.S. PATENT DOCUMENTS 5,987,459 A    11/1999    Swanson et al.
6,647,389 B1    11/2003    Fitch et al.
2003/0061206 A1    3/2003    Qian
2004/0059731 A1    3/2004    Yianilos et al.

OTHER PUBLICATIONS

T. Hidaka, Information Processing Society of Japan, pp. 3-426 - 3-427, "A Novel Information Navagation Under Multimedia Environments", 1997 (with English Abstract).

T. Hidaka, et al., Information Processing Society of Japan, pp. 3-595 - 3-596, "A Proposal for a Distribution Method of Multimedia Information", 1997 (with English Abstract).

*Primary Examiner*—Tony Mahmoudi
(74) *Attorney, Agent, or Firm*—Oblon, Spivak, McClelland, Maier & Neustadt, P.C.

(57) ABSTRACT

An apparatus for retrieving and presenting digital data, includes a network that includes data archives containing digital data, a terminal that can be connected to the network, a retrieval device that retrieves digital data, using a database of digital data retrieval information including information added to each group of digital data that can be provided over the network, and a communication quality determination device that determines a quality of communication between the terminal and a data archive containing digital data extracted by the retrieval device based on search conditions specified by a user via the terminal. Digital data sorted into an order in accordance with a priority specified by the user is downloaded to a user terminal.

4 Claims, 3 Drawing Sheets

```
┌─ USER INTERFACE ────────────── _ □ ×┐
│ WEIGHTING                             │
│                                       │
│   [  ] % KEY WORDS [      ]  [     ]  │
│                                       │
│                                       │
│   [  ] % QoS(THROUGHPUTS)             │
│                                       │
│                                       │
│        TYPE        [        ]         │
│                                       │
│                                       │
│        ☐ FORMAT                       │
│          FILTER                       │
│                                       │
└───────────────────────────────────────┘
```

MEDIUM mjk

- ◆ KEY WORDS :
- ◆ VOLUME :
- ◆ TYPE :
- ◆ FORMAT :

APPARATUS FOR RETRIEVING AND PRESENTING DIGITAL DATA

CROSS-REFERENCE TO RELATED APPLICATIONS

This application is a continuation of U.S. application Ser. No. 10/224,471 filed Aug. 21, 2002, now abandoned and is based upon and claims the benefit of priority from the prior Japanese Patent Application No. 2001-257674, filed Aug. 28, 2001, the entire contents of each of which are incorporated herein by reference.

BACKGROUND OF THE INVENTION

1. Field of the Invention

The present invention relates to an apparatus for retrieving and presenting digital data in response to a search for desired digital data by a user using a terminal connected to a network that has digital archives of multimedia data including text, voice, still images and video.

2. Description of the Prior Art

A search engine provided on a network, such as the Internet, is usually employed to retrieve digital data provided on the network, using terminals connected to the network. While search engines use various search and retrieval techniques, basically a search engine searches for information that exactly matches, or partially matches, keywords that a user inputs via the terminal. The search engine extracts the uniform resource locations (URLs) of content items that match the search criteria and presents the results to the user, organized into a certain order.

The above type of retrieved information presentation apparatus therefore only retrieves information based on matching of keywords input by the user, and does not take into account the volume of the extracted content, the quality of the network between the terminal and a digital archive including the content, and whether the terminal performance can handle the presentation or playback of the content concerned. It is therefore possible that the quality of the retrieved information obtained by the user may be low. Thus, users are not always satisfied with such apparatuses.

An object of the present invention is to provide an apparatus for retrieving and presenting digital data that takes communication quality into consideration and presents the digital data retrieval results promptly, in response to a user request.

SUMMARY OF THE INVENTION

To attain the above object, the present invention provides an apparatus for retrieving and presenting digital data, comprising:

a network that includes a data archive containing a plurality of digital data;

a terminal that can be connected to the network;

retrieval means that retrieves digital data, using a database of digital data retrieval information comprising predetermined item information added to each digital data item that can be presented over the network;

communication quality determination means that determines a quality of communication between the terminal and a data archive containing digital data extracted by the retrieval means based on search conditions specified by a user via the terminal; and information presentation means that presents digital data sorted into an order in accordance with a priority specified by the user, based on item information and communication quality relating to a group of digital data extracted by the retrieval means.

The above apparatus can also include one in which information on classes of digital data that can be handled by the terminal are stored in the information presentation means, whereby digital data extracted by retrieval of the retrieval means that cannot be handled by the terminal are excluded from the presented information.

Providing the apparatus according to the present invention with the means of determining the communication quality between a digital data archive and the terminal enables the apparatus to promptly present digital data search results in response to a user request.

Further features of the invention, its nature and various advantages will be more apparent from the accompanying drawings and following detailed description of the invention.

DESCRIPTION OF THE PREFERRED EMBODIMENT

Figure 1:
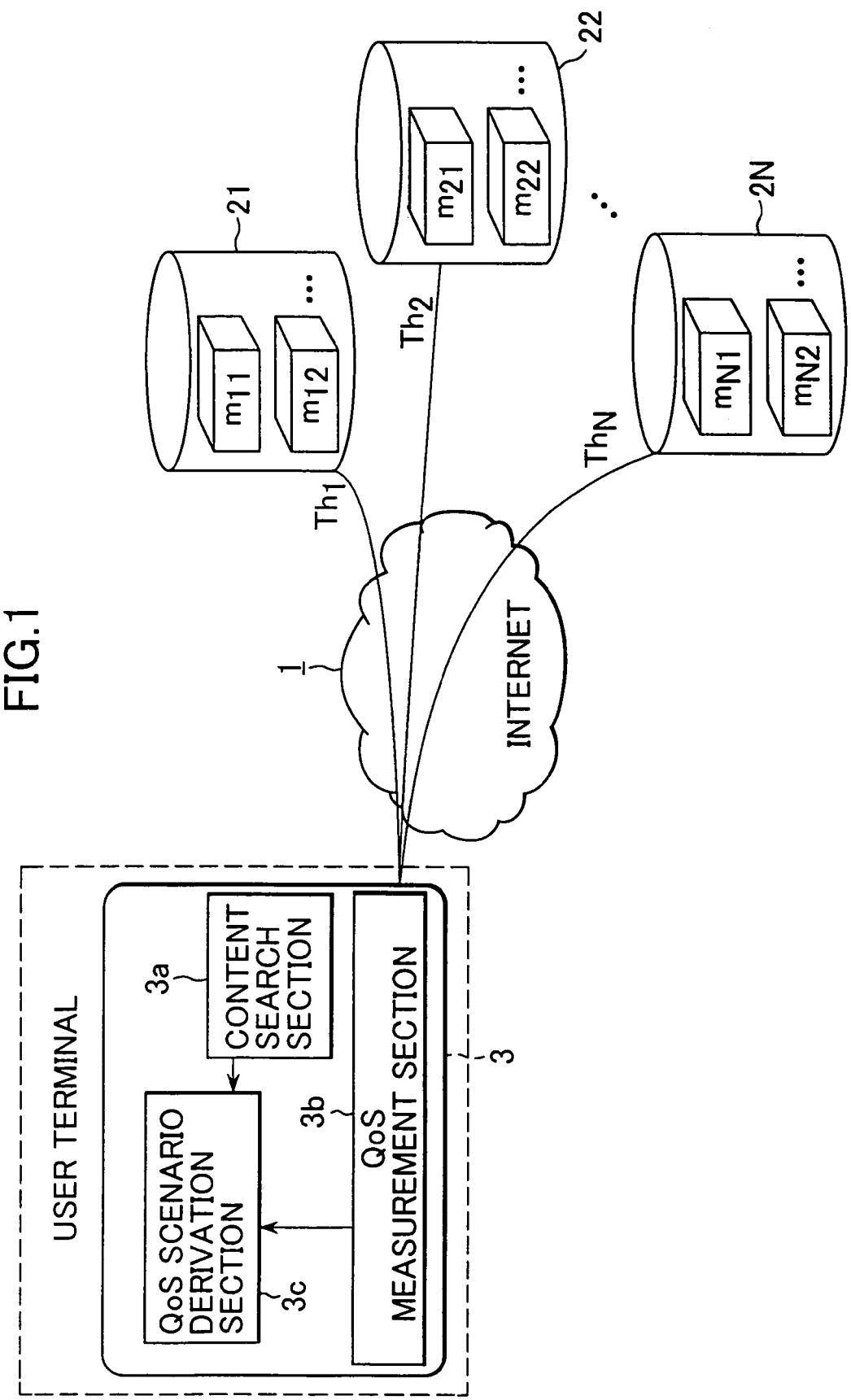
FIG. 1 shows the general configuration of an apparatus for retrieving and presenting digital data according to the present invention.

FIG. 1 shows the configuration of an apparatus for retrieving and presenting digital data according to the present invention. A network 1, such as the Internet, includes a plurality of data archives, for example first data archive 21, second data archive 22, . . . and Nth data archive 2N. The first to N-th data archives 21 to 2N store digital data. For example, first data archive 21 stores media files $m_{11}$, $m_{12}$, $m_{13}$, . . . , second data archive 22 stores media files $m_{21}$, $m_{22}$, $m_{23}$, . . . , N-th data archive 2N stores media files $m_{N1}$, $m_{N2}$, $m_{N3}$, . . . , and so on.

A user terminal 3 that is a terminal device that can be connected to the network 1 has search functions in the form of an application. Based on search conditions specified by a terminal user, digital data are extracted from the first to N-th data archives 21 to 2N and the information is presented in the order requested by the user. A content search section 3a, QoS measurement section 3b and QoS scenario derivation section 3c provided by the application on the terminal 3 will now be described.

The content search section 3a functions as a retrieval means that retrieves digital data, using a database of digital data retrieval information comprising predetermined item information added to each digital data item that can be presented over the network, and extracting data that correspond to the search criteria from the digital data media files stored in the data archives 21 to 2N. The media files $m_{jk}$, k are natural numbers, and denote the k-th digital data in the j-th archive 2j) are tagged with keywords, volume, type and format as attached information.

"Keywords" are natural-language words that express the features of each media file $m_{jk}$, "volume" is the size of each file $m_{jk}$ (in bits), "type" is the type of media, such as video, audio or text, and "format" is the method of formatting each media file when it is encoded. Thus, by building a database in which these attributes are tagged to the media files as item information, data searches can be focused using various search criteria, and the attribute information can also be used to rearrange the order of the search results.

The item information that can be used to tag data in a database for use in searches by the content search section $3a$ is not limited to the above four types, but may be arbitrarily set. Also, a database used for the searching of data by the content search section $3a$ does not have to be provided for each user terminal 3, but may instead be placed on the network 1, along with the content search function itself, with search results being sent to a terminal 3 in response to a request from the terminal 3 concerned.

The QoS measurement section $3b$ functions as a communication quality determination means that determines a quality of communication between a data archive containing digital data extracted by the retrieval means based on search conditions specified by a user via the terminal, and the terminal. For this, the QoS measurement section $3b$ measures the speed of communication to rank the QoS based on network quality and terminal performance. Specifically, the QoS measurement section $3b$ measures the network throughput, in bits per second, from the user terminal 3 on which the application is running to the j-th archive $2j$ that stores media file $m_{jk}$ in which the search scores a hit. Measured throughputs are denoted by $Th_j$ (measured throughput $Th_1$ from terminal 3 to the first data archive 21, measured throughput $Th_2$ from terminal 3 to the second data archive 22, . . . , and measured throughput $Th_N$ from terminal 3 to the N-th archive 2N).

The QoS scenario derivation section $3c$ functions as an information presentation means that presents digital data sorted into an order in accordance with a priority specified by the user, based on item information and communication quality relating to each digital data group extracted by the retrieval means. The QoS scenario derivation section $3c$ uses the communication quality measured by the QoS measurement section $3b$ and the ranking based on the user request input via the terminal to determine the final order in which the plurality of hits of the media file are presented to the user. The QoS scenario derivation section $3c$ can present the information in a media retrieval order that reflects the user's preference. This final order of media files is called "the QoS scenario." Thus, in this embodiment, the QoS scenario derivation section $3c$ presents to the user the derived QoS scenario, that is, the order in which media hits are retrieved.

Figures 2, 3:
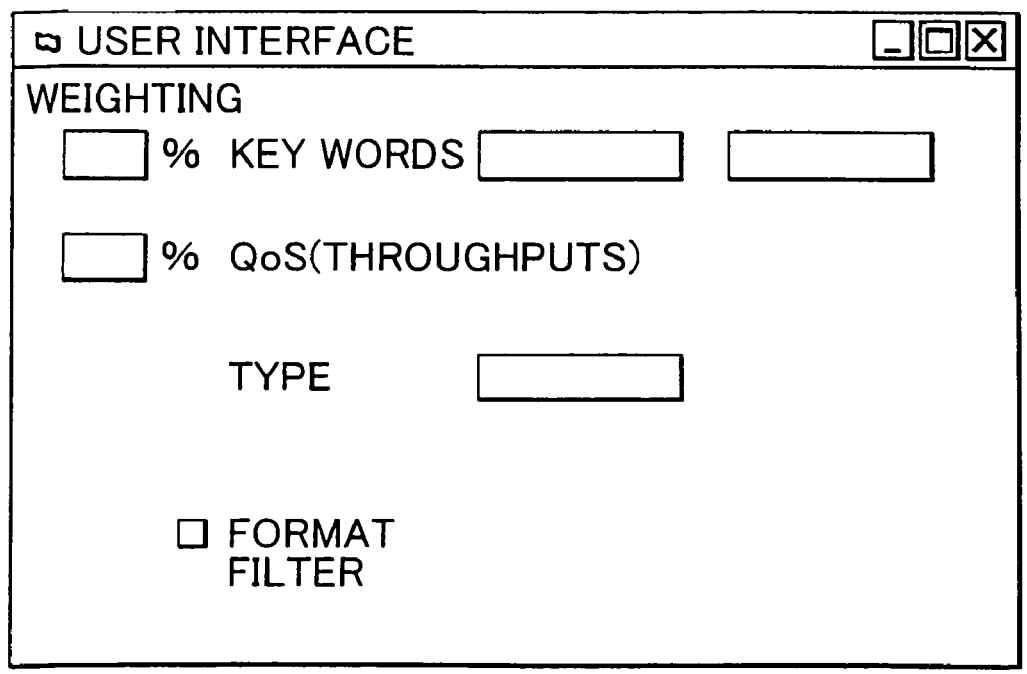
FIG. 2 shows information attached to the respective media.
FIG. 3 is a user interface window image.

FIG. 3 shows an example of a user interface window for specifying various conditions for deriving a QoS scenario. The user inputs keywords that express the required information; the keywords are used for searches by the content search section $3a$. For presentation, the QoS scenario derivation section $3c$ ranks the information using an importance weighting parameter that specifies whether keyword or QoS is given a relatively higher weighting. If, for example, a weighting $W_k$ is specified for a keyword and a weighting $W_q$ is specified for the QoS (where $0 \leq W_k, W_q \leq 100$, $W_k+W_q=100$), the media hits are ranked based on the percentage values of $W_k$ and $W_q$. The apparatus can be arranged so that even if the user, in inputting $W_k$ and $W_q$, inputs a numerical value that exceeds these constraints, the input is automatically normalized, or so that when one percentage is specified, the other percentage is determined automatically.

"Type" in the user interface window of FIG. 3 is used to specify the media type that has first priority, such as text, for example. The QoS scenario derivation section $3c$ raises the priority level of this media type in the ranking. Specifying the media type is optional. Whether or not the required type is specified is a decision that can be left to the user. Checking the "format filter" checkbox will cause the apparatus to filter out media files m that are in a format that cannot be decoded by the terminal 3. This corresponds to the above-described function provided in the QoS scenario derivation section $3c$ whereby the classes of digital data that can be handled by the terminal are stored in the information presentation means, and digital data files that are extracted by the retrieval means but cannot be handled by the terminal are excluded from the presented information. Information on the format types that can be decoded by the terminal 3 can be stored in the QoS scenario derivation section $3c$ at the time of application installation, or can be stored at some subsequent time by the user.

Figure 4:
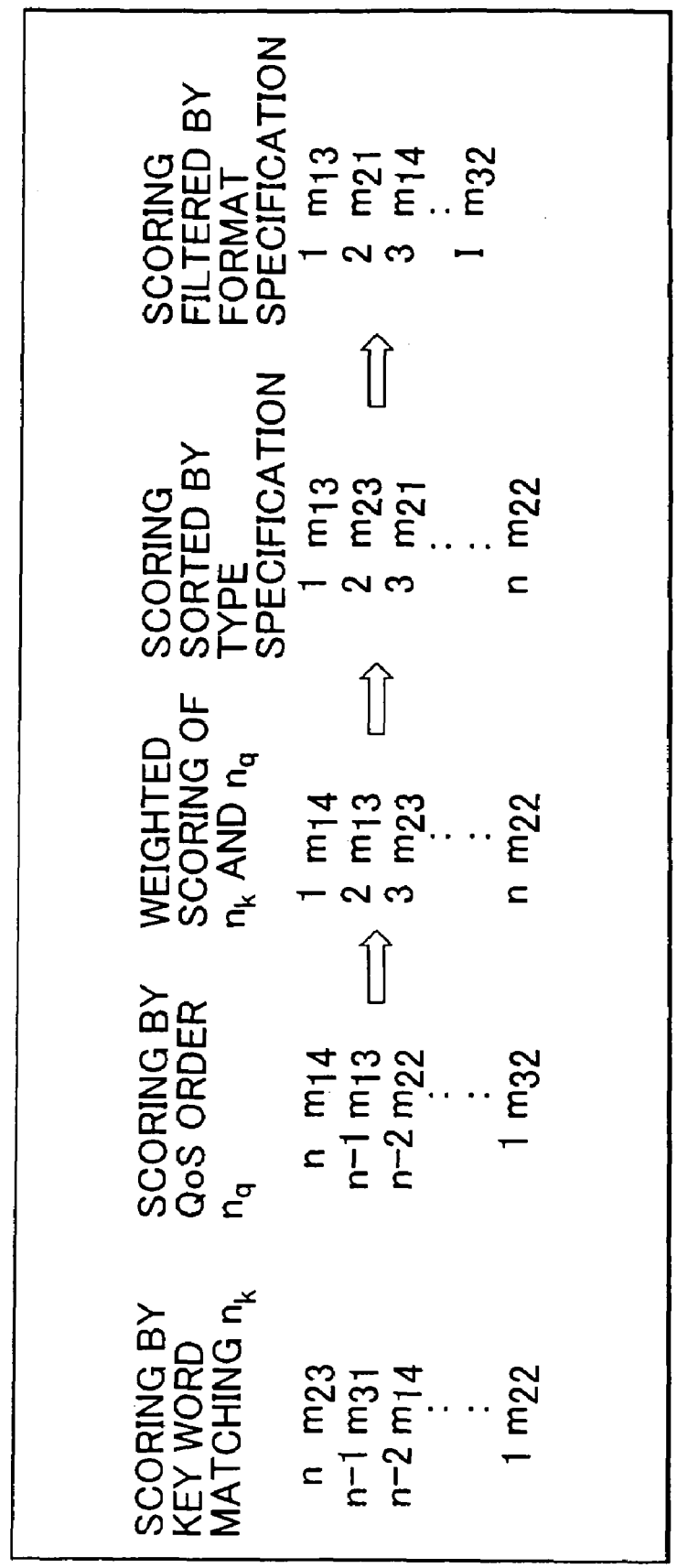
FIG. 4 shows the quality of service (QoS) scenario derivation process.

An example of the QoS scenario derivation process will now be described with reference to FIG. 4. The process starts when the user uses the interface window to input a search request. When the user request is received, keyword matching is used to search a plurality of archive media files (first to N-th data archives 21 to 2N). Assuming there are n media hits (where n is a natural number), the retrieved media files are each given a score that goes from n down to 1, based on the similarity between the words input by the user and the reference keywords in the apparatus, generating a media retrieval score $n_k$. A higher $n_k$ score (that is, closer to n) indicates a degree of keyword matching. There is no particular limitation on the keyword matching method used. For example, a thesaurus can be used to determine the degree of similarity to the keywords, or used together with fuzzy logic techniques to enable keyword matching that includes degrees of ambiguity.

Throughputs to digital archives containing media that generate search hits are measured, and for each media$_{jk}$, the volume of $m_{jk}$ is divided by the throughput $Th_j$ to the archive concerned. This value is an indication as to the time it will take to download each of the media $m_{jk}$ from the archive to the terminal 3, and is used to generate scores $n_q$ in order from n to 1, starting from the low end. Thus, a larger $n_q$ score (one that is closer to n) signifies easier retrieval.

For each of n media files $w_k \times n_k(m_{jk})+w_q \times n_q(m_k)$ is calculated: the larger this value, the higher the scored order the mediafile is given, going in descending order from 1st to n-th. This order takes into account the weighted order shown in FIG. 4. The $n_k(m_{jk})$ and $n_q(m_k)$ in the above calculation signify the $m_{jk}$ scores in $n_k$ and $n_q$, respectively.

Next, the data is sorted by media type, giving precedence to the type of media specified by the user, which is moved up to a higher level than media that has not been thus specified. Specifying the media type is optional, so the data is not thus sorted unless the user specifically specifies the "Type" option.

Finally, if the "Format filter" checkbox has been checked, media that cannot be decoded by the terminal is filtered out, resulting in the cancellation of I media files from the n files of media with search hits ($I \leq n$). This is the format-based filtering shown in FIG. 4. When QoS scenarios for media assigned an order from 1 to I are determined, media collection proceeds in accordance with that order. The QoS scenarios thus determined are ideally suited for building a digital museum that can present exhibits in response to a user request by gathering information distributed on the network.

A user who makes such a request can first be shown multimedia data or the like that can be quickly downloaded, and the remaining multimedia data can then be collected while the user is regarding the initial portion, thus reducing the user response time, which is the time it takes for the requested data to be downloaded to the user's terminal. The apparatus for retrieving and presenting digital data according to the invention can also exclude data that cannot be handled by the user terminal, reducing time that would otherwise be wasted.

What is claimed is:

1. An apparatus for retrieving and presenting digital data, comprising:

a network that includes plural data archives each containing a plurality of multimedia digital data;

a terminal configured to be connected to the network;

a database of digital data retrieval information comprising predetermined item information added to each of digital data that can be presented over the network;

retrieval unit configured to retrieve digital data corresponding to retrieval conditions based on item information specified by a keyword input by a terminal user, using the database, and extracts the retrieved digital data;

communication quality determination unit configured to measure a throughput in bits per second of a network path from a data archive containing the retrieved digital data to the terminal, divide a volume of the extracted digital data by the throughput to calculate a time it takes to download each of the extracted digital data from the data archive to the terminal and to generate scores in order from a low end of values calculated relative to the individual extracted digital data, thereby determining communication quality of the extracted digital data; and information presentation unit configured to present the extracted digital data in an order in accordance with a priority specified by the user, based on a matching property with the item information and on the communication quality.

2. An apparatus for retrieving and presenting digital data according to claim 1, wherein the information presentation unit beforehand stores therein information on classes of digital data that can be handled by the terminal, filters out digital data that cannot be handled by the terminal from the digital data extracted presented in the order, and presents the digital data having the digital data filtered out in an order in accordance with a priority specified by the user.

3. An apparatus for retrieving and presenting digital data according to claim 1, wherein the information presentation unit is configured to present the extracted digital data in an order by a procedure comprising:

using scores $n_k$ prepared in order from a high end of matching property based on a matching standard relative to item information specified by the terminal user with respect to each of digital data $m_{jk}$ extracted by the retrieval unit, in which $m_{jk}$ means a k-th data m in a j-th archive, and j and k are natural numbers, respectively, and using scores $n_q$ prepared through division of a volume of each digital data $m_{jk}$ by a throughput $Th_j$ from the j-th data archive containing the extracted digital data $m_{jk}$ to the terminal to calculate a time it takes to download each of the extracted digital data from the archive containing the extracted digital data to the terminal, thereby enabling the scores to have score numbers in order from a low end of values calculated; and obtaining values from formula $w_k n_k + w_q n_q$ with respect to a level of importance $w_q$ of the communication quality and a level of importance $w_k$ of the item information, wherein $0 \leq w_k, w_q \leq 100$ and $w_k + w_q = 100$, to present the digital data $m_{jk}$ in order from a high end of the obtained values.

4. An apparatus for retrieving and presenting digital data according to claim 1, wherein the multimedia digital data include text, voice, still images and video.

* * * * *